Figure 2A:
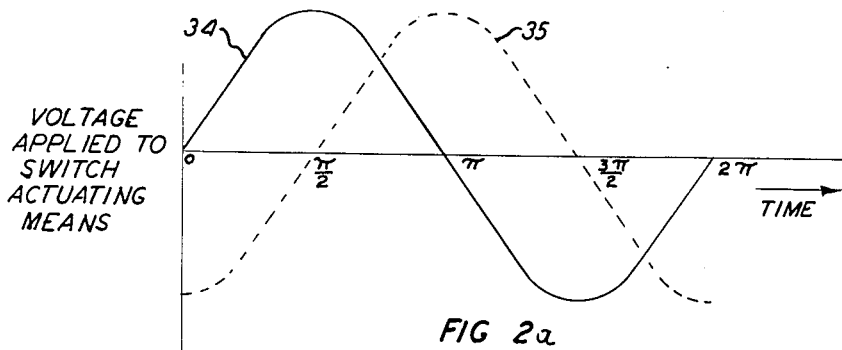

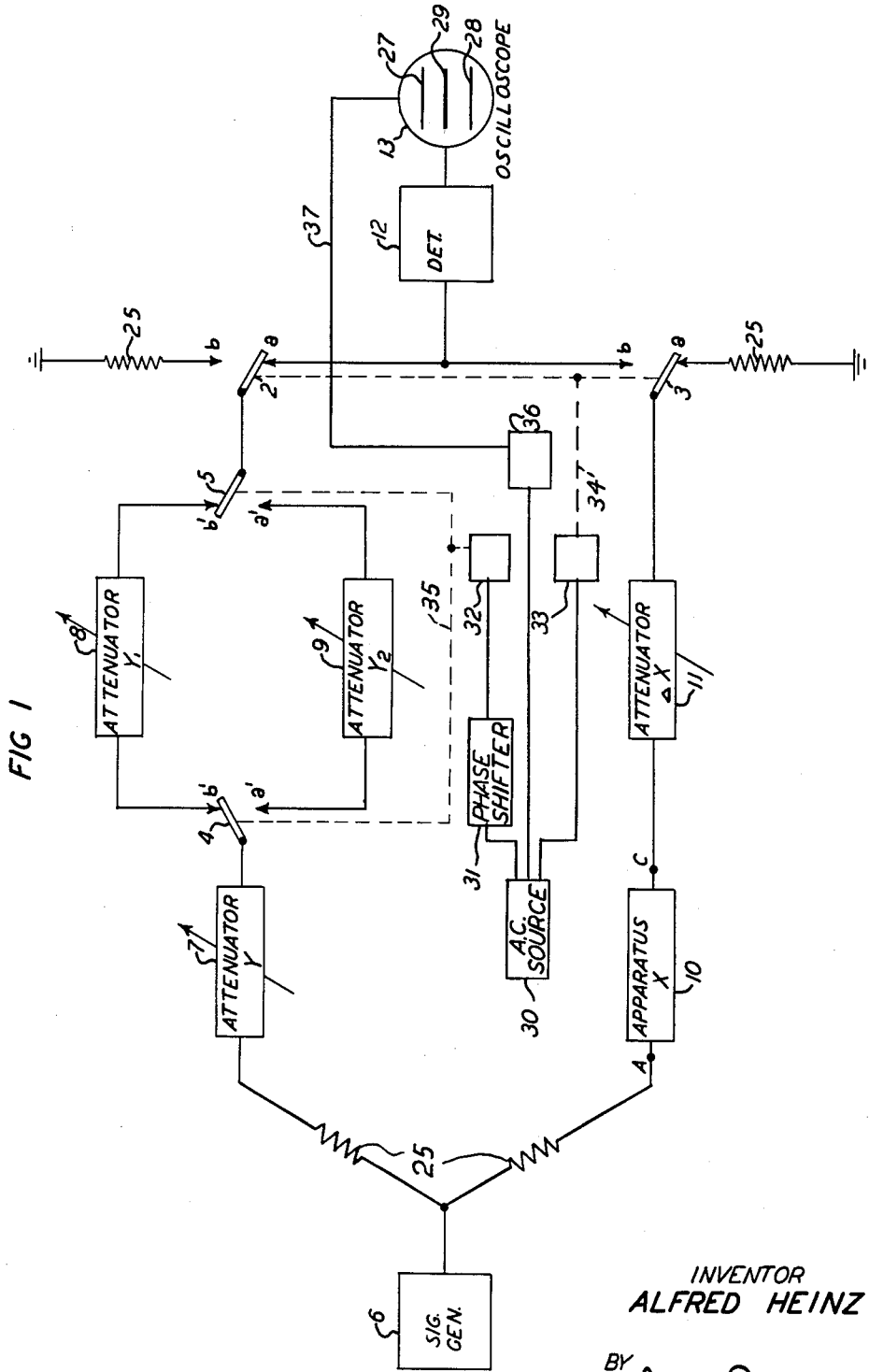

INVENTOR
ALFRED HEINZ
ATTORNEY

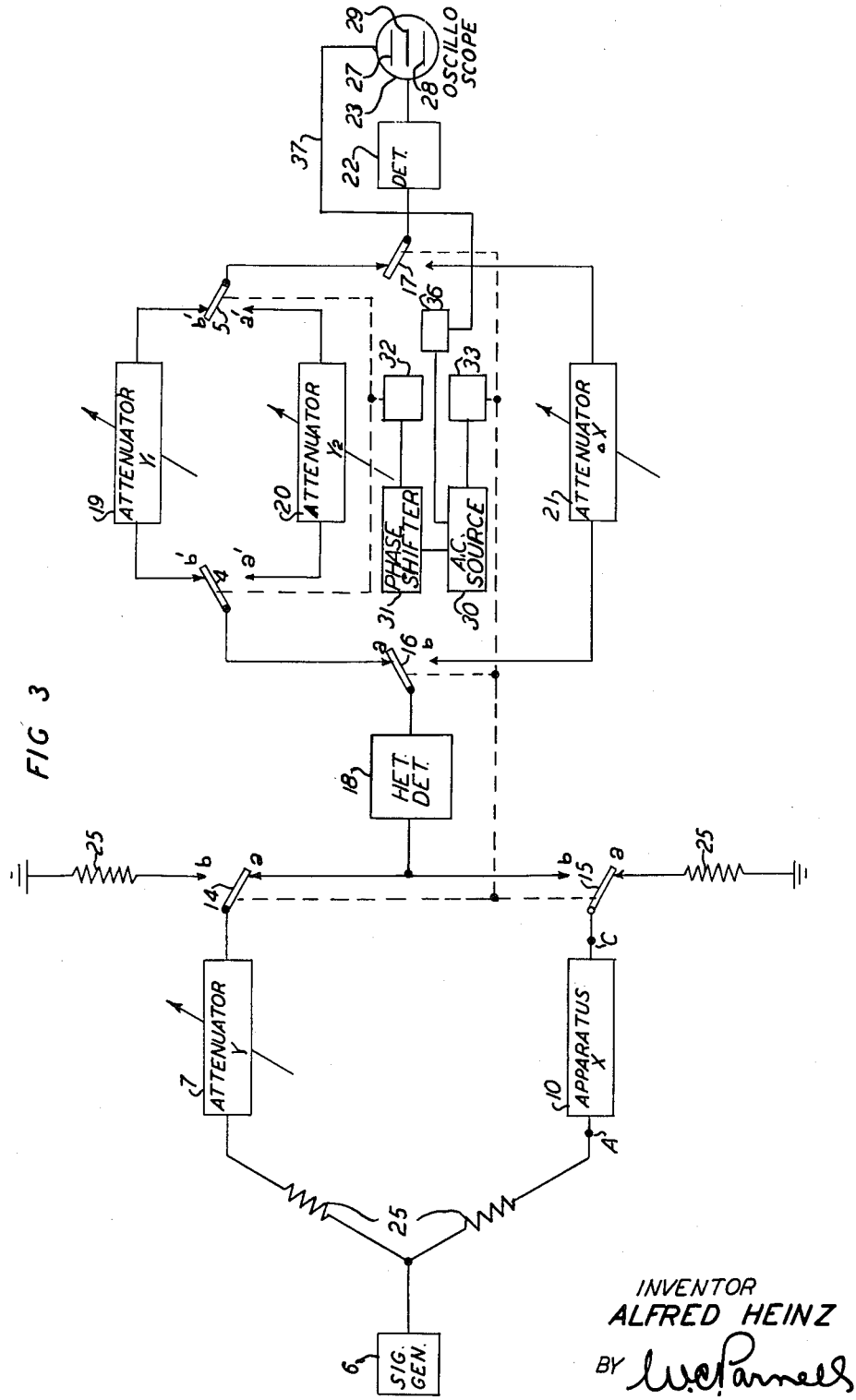

United States Patent Office 2,755,436
Patented July 17, 1956

2,755,436

METHOD AND APPARATUS FOR MAKING INSERTION LOSS MEASUREMENTS

Alfred Heinz, Union, N. J., assignor to Western Electric Company, Incorporated, New York, N. Y., a corporation of New York Application May 9, 1952, Serial No. 287,068

6 Claims. (Cl. 324—57)

This invention relates to transmission measurements and particularly to a method of and a system for measuring the insertion loss of communication apparatus components.

The general object of the invention is to determine accurately whether the insertion loss of apparatus is within tolerance limits over a band of frequencies. Transmission loss as used herein, includes both loss and gain.

Heretofore, the conventional insertion loss measuring technique involved a signal generator and a detector connected together by what was generally considered the measuring circuit comprising two branches; a test and a reference branch. In the operation of the test, the apparatus to be tested was connected to the test branch (between the signal generator and the detector) and the signal generator and the detector were adjusted to give a convenient indicator reading. The test branch was then switched out of the circuit and the reference branch which consists of an attenuator was switched into the circuit. This attenuator was then adjusted to give the same indicator reading. The reading of this attenuator then was taken as being equal to the insertion loss of the apparatus under test.

A great disadvantage of this method of testing is that the amplitude of the signal generator output or the gain of the detector may vary in the time required for switching and adjusting the circuit. These instabilities, although quite small, may be significant due to the very high degree of accuracy required in the measurement of certain components in the newer communications system. As a result, this conventional method of testing has become unsatisfactory for up-to-date requirements.

Applicant has devised a method for testing apparatus components for insertion loss which eliminates the inaccuracy discussed above and which also permits a direct visual interpretation of the apparatus loss in terms of its tolerance limits without requiring the time consuming operation of adjusting the attenuator for balance. In accordance with one embodiment, the two paths (corresponding to the test and reference branches of the conventional circuit) of a comparison test circuit are alternately and automatically connected to an oscilloscope indicator. The attenuator or reference branch has two sub-paths of different attenuation corresponding to the tolerance limits of the loss. These sub-paths are connected to the circuit alternately. The oscilloscope then shows two limiting traces between which the trace of the apparatus under test must fall.

An additional feature of this circuit is an auxiliary adjustable attenuator in the apparatus path set to compensate for the difference between a nominal loss and a loss at the reference frequency thereby eliminating the computations formerly required to establish nominal loss values. The term "nominal loss" as used herein is the loss prescribed for the apparatus for the various frequencies at which the apparatus is to be tested.

The nature of the invention will be more fully understood from the following detailed description, and by reference to the accompanying drawings of which:

Fig. 1 is a schematic diagram showing an embodiment of the invention;

Fig. 2, a, b, c and d are explanatory diagrams used in connection with the discussion concerning the switching arrangement employed;

Fig. 3 is another embodiment of the invention.

In the embodiment of the invention shown in Fig. 1, a signal generator 6 is connected to a detector 12 and oscilloscope 13. The transmission path the signal takes is controlled by switches 2, 3, 4 and 5. These switches may be either electronic (amplifier triggered by control pulse) or of a high speed mechanical type. The switches 2 and 3 must operate in synchronism while switches 4 and 5 must be actuated at midpoints of the switching cycle of switches 2 and 3. A convenient operating frequency for these switches would be 60 cycles per second. To assure the simultaneous action of the corresponding switches, they may be ganged together as shown by dashed lines 34 and 35. To maintain the proper timing sequence the switch actuating voltages are derived from the same alternating current source 30. The voltage for the actuating means 33 of switches 2 and 3 is supplied directly from the source and that applied to the actuating means 32 for switches 4 and 5 is shifted 90° in phase by a phase shifter 31. The switch activating means 32 and 33 may be either mechanical or electronic switching means.

Figure 2B:
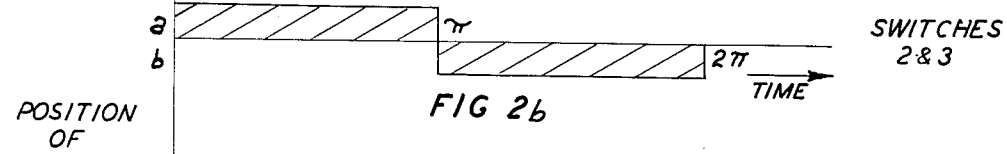
Figure 2C:
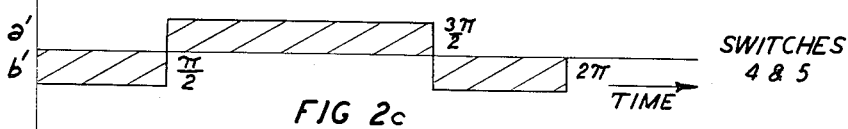
Figure 2D:
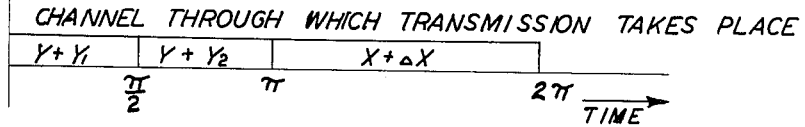

Fig. 2a shows the phasing of the voltages applied to the switch actuating means 32 and 33. The curve 34 being the input to 33 and the curve 35 being the input to 32. Figs. 2b and 2c show the condition of the contacts due to the switch actuation. By reference to Figs. 1, 2b and 2c, it may be seen that transmission will be as shown in Fig. 2d. That is, through $Y+Y_1$ sub-path for the first one quarter cycle through $Y+Y_2$ sub-path for the second one quarter cycle and through $X+\Delta X$ path for the second one half cycle. Synchronized sweep potential for the oscilloscope 13 may be readily obtained from the source 30 through a conventional frequency multiplying device 36 which supplies to the oscilloscope over conductor 37 a sweep frequency of four times the switching rate or a multiple thereof, so that successive sweeps will produce superimposed patterns. The sweep potential must be of this frequency to produce a full oscilloscope presentation since conduction through each of the sub-branches occurs for only one quarter of the switching cycle. The relative transmission levels will be indicated by the spacing of the horizontal lines (27, 28, 29) displayed on the face of the oscilloscope 13. The line 29 corresponding to the transmission through the $X+\Delta X$ branch will appear somewhat heavier since it will be displayed twice as long as those of the Y sub-branches and can thus be readily identified. Variations in signal generator 6 output voltage or in detector 12 gain will cause a shift in vertical position of all the lines displayed, but the spacing between the lines will remain constant thereby eliminating two of the major sources of instability and resultant inaccuracy.

The $Y_1$ and $Y_2$ sub-paths are the "tolerance" branches. That is, their attenuators 8 and 9 are so arranged that the transmission through the main Y path can be further modified by an amount equal to that represented by the apparatus tolerances. This is accomplished as follows:

Attenuator 7 is the "master attenuator." In tests other than those related to the reference test, this attenuator is set to the nominal or the prescribed loss for the test. Attenuator 8 is a three decade (1.0, 0.1 and 0.01 db) arrangement so calibrated that the attenuation for a given setting is equal to 6 db plus the increment indicated by the dial reading. Attenuator 9 differs from attenuator 8 only in that its attenuation for a given setting is 6 db minus the increment indicated by the dial reading. The 6 db offset is an arbitrary choice and has no significance except that it must be large enough to cover the widest tolerance met in practice.

The ΔX section of the X branch is another attenuator 11 similar to the $Y_1$ and $Y_2$ attenuators, but different in that it covers the range of —6.0 to 0 to +6 db with a 6 db offset as in the $Y_1$ and $Y_2$ sub-branches, that is, the total attenuation is 6 db plus or minus the dial reading. This attenuator is used to compensate for the amount of attenuation by which a test unit may depart from the nominal value listed in the apparatus specifications. This applies only to the so-called reference tests.

The dummy line matching resistors 25 keep the load to the signal generator 6 substantially constant for the different switching positions, the impedance value of each of these resistors 25 being substantially equal to the circuit impedance which is equal to the prescribed circuit impedance for the insertion loss measurements, that is, equal to the line impedance as seen in either direction from the apparatus under test. The tendency of the output level of the signal generator to vary for different load conditions is thereby minimized.

Normally the tests would be conducted as follows:

With test terminals A and C strapped together to remove apparatus from the circuit and all attenuators set to zero, the zero loss is measured. The three lines should fall on top of each other. The test unit 10 is then inserted and the master attenuator 7 is set to the nominal value listed in the requirements. Attenuators 8 and 9 are set to their respective tolerance values. The detector 12 is then adjusted for an On Screen presentation of the three lines 27, 28 and 29. If the heavy line 29 lies between the two light tolerance lines 27 and 28, apparatus requirements are met and the matter attenuator 7 need not be adjusted since the exact loss value need not be found. The only information needed is assurance that the actual loss falls within the guard brands defined by the tolerances. Since the attenuator 7 is set to the nominal value and the attenuators 8 and 9 prescribe the tolerance guard band, it is obvious that requirements are met if the apparatus loss falls within that guard band as presented on the oscilloscope 13.

The ΔX attenuator 11 is used only where a reference value (M) is called for. In that case, the tests outlined in 2 above are modified to the extent that if the loss for the reference test (M) is not exactly equal to the nominal value then the ΔX attenuator 11 is adjusted to compensate for the difference. That is, the ΔX attenuator 11 is adjusted to yield a scope presentation wherein the heavy line 29 lies in a position midway between the two tolerance lines 27 and 28. Thereafter, the ΔX attenuator 11 setting is left undisturbed for all tests related to the reference test.

The settings of the various attenuators for typical tests, on one type of filter network are as follows:

| Test No. | Frequency, mc. | Nominal Loss, db | Tolerance ± db | Attenuator Settings | | | |
|---|---|---|---|---|---|---|---|
| | | | | Y | $Y_1$ | $Y_2$ | ΔX |
| 1 | 2.00 | 57.3 | 0.3 | 57.3 | 0.3 | 0.3 | |
| 2 | 2.75 | 47.1 | 0.3 | 47.1 | 0.3 | 0.3 | |
| 6 | 8.6 | 70.6 | 0.6 | 70.6 | 0.6 | 0.6 | |
| 4 [1] | 7.945 | 4.15 | 0.14 | 4.15 | 0.14 | 0.14 | |
| 10 [2] | 5.00 | M-3.71 | 0.07 | 0.44 (4.15-3.71) | 0.07 | 0.07 | 4.15-M |
| 11 [2] | 6.00 | M-3.79 | 0.07 | 0.36 (4.15-3.79) | 0.07 | 0.07 | 4.15-M |
| 12 [2] | 7.00 | M-3.65 | 0.07 | 0.50 (4.15-3.65) | 0.07 | 0.07 | 4.15-M |
| 13 [2] | 7.834 | M-2.69 | 0.07 | 1.46 (4.15-2.69) | 0.07 | 0.07 | 4.15-M |

[1] Reference test.
[2] Where "M" is the actual loss at the reference frequency.

A study of the above table will show that the proposed attenuator scheme will greatly simplify testing procedures. For tests where requirements list a fixed nominal loss value and tolerances, the respective attenuators are set to these values while the ΔX attenuator 11 is set to zero. For cases where losses are related to those of reference test, the ΔX attenuator is adjusted so that the combined loss of the test unit at reference frequency and the reading of the ΔX attenuator equals the nominal value listed in the requirements. Thereafter the ΔX attenuator is left undisturbed for all tests related to the reference value (M) and the rest of the attenuators are set as before to the nominal values listed in the requirements.

The scheme outlined will improve testing technique as follows:

A. Adjusting of attenuators for circuit balance will be eliminated.

B. Repetition of tests to obtain an average reading will not be required.

C. Computations to establish nominal loss values for each test unit will be eliminated.

Fig. 3 shows a circuit basically similar to Fig. 1, the principal difference is that the frequency of the signals passing through the paths is reduced by means of a heterodyne detector 18 whereby relatively inexpensive low frequency attenuators 19, 20 and 21 may be used for the $Y_1$, $Y_2$ and the ΔX attenuators. The only switching modification required in this circuit is that switches 14, 15, 16 and 17 operate in synchronism similar to switches 2 and 3 of Fig. 1, while switches 4 and 5 (as in Fig. 1) are actuated at midpoints of the switching cycle of switches 14, 15, 16 and 17.

The detector 22 and oscilloscope 23 serve similar functions to detector 12 and oscilloscope 13 of Fig. 1, except that they respond to the reduced frequencies of the heterodyne detector 18 and not to the frequencies of the signal generator 6.

Although a master attenuator 7 has been shown in the drawing, it is to be understood that this attenuator could be replaced with a standard unit of the type to be tested or with another element having the prescribed losses at the various test frequencies. In production testing, the use of such a unit would reduce the time required for each test and also minimize any errors due to operator's mistakes in adjusting the attenuators.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A method of determining quickly and accurately whether the insertion loss of electrical apparatus is within predetermined tolerances which comprises transmitting a known signal alternately, in rapid succession and for substantially equal time intervals, through the apparatus and through a path of known attenuation, varying the known attenuation between two known limiting values and producing three simultaneously visible indications of the levels of the signal after transmission through the apparatus and through the two limiting values of attenuation, the resultant visible indication of the signal through the apparatus being of different intensity than that for the two limiting values of attenuation.

2. A method of determining quickly and accurately whether the insertion loss of electrical apparatus is within predetermined tolerances which comprises transmitting a known alternating current signal alternately, in rapid succession and for substantially equal time intervals, through the apparatus and through a path of known attenuation, reducing the frequency of the signal from the apparatus and from the known attenuator, passing the reduced frequency signal from the path of known attenuation alternately through two sub-paths of known limiting attenuations, producing an indication of the reduced frequency from the apparatus and simultaneously producing indications of the signals transmitted through the two sub-paths, the resultant visible indication of the signal through the apparatus being of different intensity than that for the two limiting values of attenuation.

3. In an insertion loss measuring system the combination with a signal generator, an oscilloscope, a first transmission path including an element of known attenuation, a second transmission path including apparatus to be tested and means for connecting the oscilloscope to the signal generator through said paths alternately, in rapid succession and for substantially equal time intervals, to produce indications on the oscilloscope of the relative transmission losses in the two paths, of two transmission sub-paths of different attenuations corresponding to tolerance limits for the apparatus to be tested, means for automatically connecting the sub-paths alternately in series with the said element of the first path while the first path is connected to the oscilloscope to produce visual limit traces on the oscilloscope of less intensity than the trace for the apparatus under test.

4. A system according to claim 3 having means for reducing the frequency of the signals transmitted through the element of known attenuation and the apparatus and for transmittting the reduced frequency through the two sub-paths.

5. A system according to claim 3 having a calibrated variable attenuator serially connected in the second path for inserting a predetermined attenuation equal to the difference between the nominal and the actual losses of the apparatus at a particular reference frequency.

6. In an insertion loss measuring system the combination with a signal generator, an oscilloscope, a first transmission path including an element of known attenuation, a second transmission path including apparatus to be tested and means for connecting the oscilloscope to the signal generator through said paths alternately, in rapid succession, to produce indications on the oscilloscope of the relative transmission losses in the two paths, of two sub-paths of different attenuations corresponding to tolerance limits for the apparatus to be tested, means operating in phase quadrature to the first connecting means for connecting the sub-paths alternately into the first path, a variable attenuator for inserting a predetermined attenuation equal to the difference between the nominal and the actual losses of the apparatus at a particular reference frequency serially connected in the second path, and means connected to the two paths for reducing the frequency of the signals applied to the sub-paths and the variable attenuator.

References Cited in the file of this patent
UNITED STATES PATENTS

| | | |
|---|---|---|
| 2,047,782 | Jensen | July 14, 1936 |
| 2,479,051 | Sunstein | Aug. 16, 1949 |
| 2,611,811 | Yates | Sept. 23, 1952 |
| 2,626,980 | Balde et al. | Jan. 27, 1953 |